United States Patent [19]

Bardotti

[11] 4,001,784
[45] Jan. 4, 1977

[54] DATA PROCESSING SYSTEM HAVING A PLURALITY OF INPUT/OUTPUT CHANNELS AND PHYSICAL RESOURCES DEDICATED TO DISTINCT AND INTERRUPTIBLE SERVICE LEVELS

[75] Inventor: Angelo Bardotti, Cesano Boscone (Milan), Italy

[73] Assignee: Honeywell Information Systems Italia, Milan, Italy

[22] Filed: Dec. 20, 1974

[21] Appl. No.: 534,963

[30] Foreign Application Priority Data

Dec. 27, 1973 Italy .................................. 32162/73

[52] U.S. Cl. .......................................... 340/172.5
[51] Int. Cl.² ...................... G06F 3/04; G06F 9/18
[58] Field of Search .................................. 340/172.5

[56] References Cited
UNITED STATES PATENTS

| | | | |
|---|---|---|---|
| 3,297,996 | 1/1967 | Grady | 340/172.5 |
| 3,391,394 | 7/1968 | Ottaway et al. | 340/172.5 |
| 3,399,384 | 8/1968 | Crockett et al. | 340/172.5 |
| 3,478,321 | 11/1969 | Cooper et al. | 340/172.5 |
| 3,699,530 | 10/1972 | Capowski et al. | 340/172.5 |
| 3,702,462 | 11/1972 | England | 340/172.5 |
| 3,815,105 | 6/1974 | Adkins et al. | 340/172.5 |
| 3,825,902 | 7/1974 | Brown et al. | 340/172.5 |
| 3,829,839 | 8/1974 | Jeane | 340/172.5 |
| 3,925,766 | 12/1975 | Bardotti et al. | 340/172.5 |

*Primary Examiner*—Melvin B. Chapnick
*Attorney, Agent, or Firm*—William W. Holloway, Jr.; Nicholas Prasinos; Ronald T. Reiling

[57] ABSTRACT

In a data processing system having a plurality of input/output channels, a first plurality of physical resources is dedicated to each of the channels. Said first plurality is sufficient only to enable standard data character exchanges between each of the channels and the central processing unit in a time-sharing manner. A second plurality of physical resources (including registers and logic) is provided which is dedicated to a corresponding plurality of service classes. The service classes are ordered according to a priority criterion and selectively assigned to different channels in accordance with the priority level of the interrupt which has requested the service. In this manner, while services of the same class are not reciprocally interruptible, services of different classes on different channels are hierarchically interruptible.

3 Claims, 13 Drawing Figures

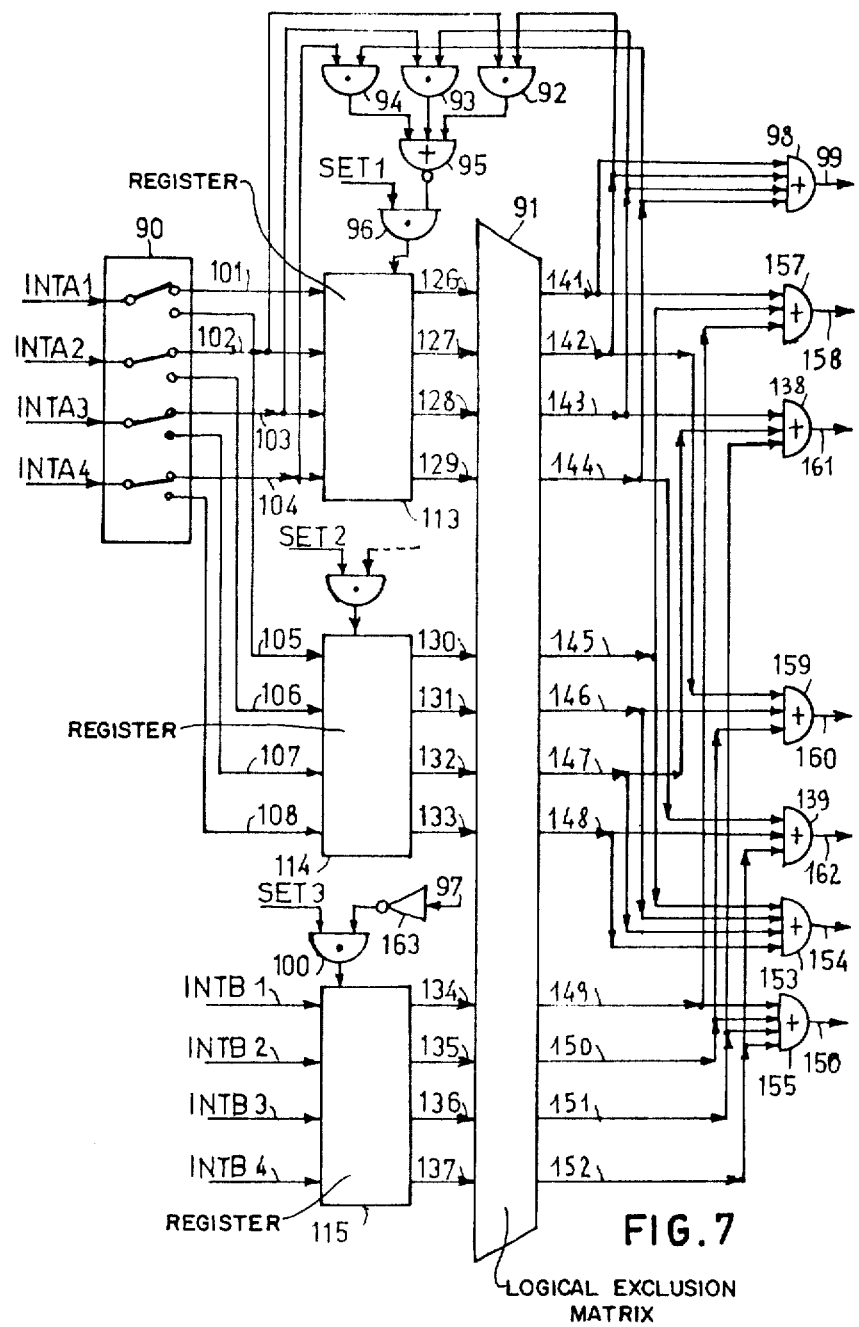

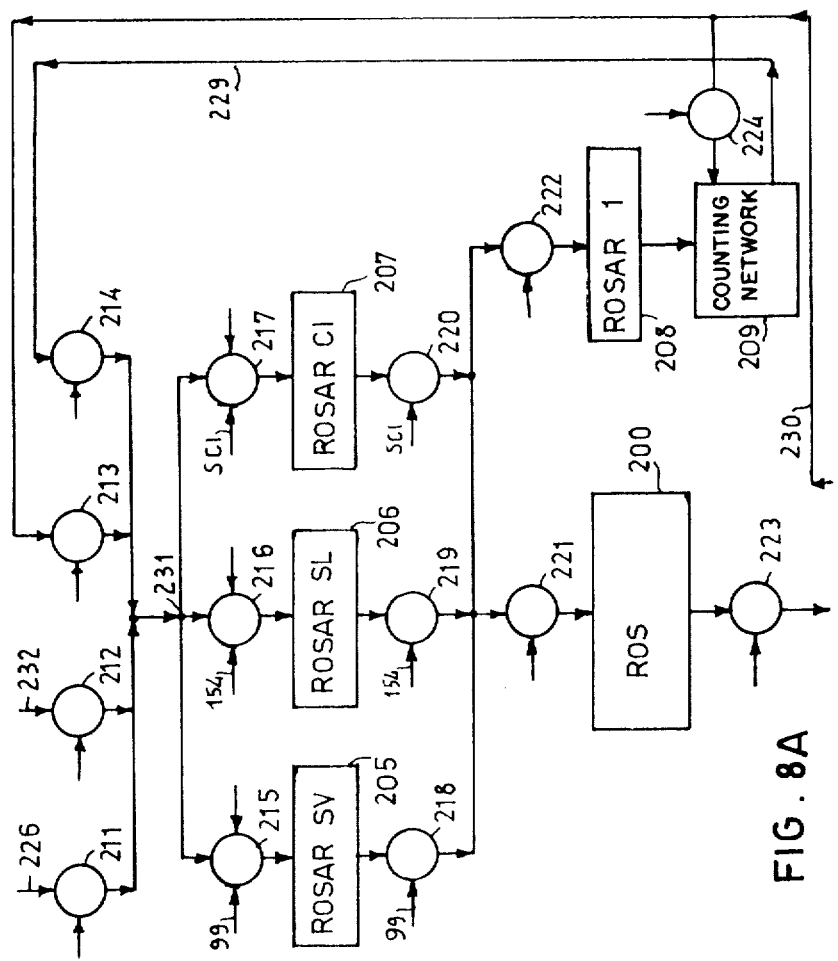

DATA PROCESSING SYSTEM HAVING A PLURALITY OF INPUT/OUTPUT CHANNELS AND PHYSICAL RESOURCES DEDICATED TO DISTINCT AND INTERRUPTIBLE SERVICE LEVELS

BACKGROUND OF THE INVENTION

1. Field of the Invention

The present invention relates generally to data processing systems and more precisely to central processors provided with a plurality of input/output channels for connection with peripheral units.

2. Description of the Prior Art

It is known that data processing systems generally include a central processor, a main working memory and a plurality of peripheral units connected to the central processor through a plurality of information exchange (input/output) channels. From the logical point of view, the central processor may be divided into a control unit and an execution unit.

The task of the data processing system is to perform operative processes on data according to well defined program instructions. The operations are coordinated by the control unit within the central processor of the system. The operative processes may be internal (that is, executed within the central processor), or internal/external (that is, require, in addition, the intervention of a peripheral unit). In the latter case, they require the transfer of information to and from the central processor through the input/output channels which connect the peripheral unit to the central processor and which enable the execution of operations for such information transfer.

The operation of peripheral devices and the execution of processes on them are not synchronized either with respect to the operation of the central processor or with respect to each other. The supervision of the whole system is not performed with a program uniquely defined from the point of view of timing, but rather performed with "interrupts" which request execution of predetermined services during suitable phases of execution of a program.

Interrupts may be caused by interrupt requests coming from the peripheral devices. Following an interrupt request, the central processor may interrupt the execution of an internal process under execution so as to dedicate itself to the service requested by the peripheral device. Different criteria may be established for classifying the interrupt requests. For the moment, it suffices to remark that such requests are physically characterized by the presence of a suitable electrical signal pulse or continuous signal on one or more wires comprising the information exchange channels which connect the central processor to the peripheral devices. In systems having a plurality of input/output channels, several interrupt requests may be contemporaneously sent to the central processor through different channels. Therefore, it is mandatory to establish priority criteria; that is, to define an order for honoring different interrupt requests. In addition, it is clear that in the same way interrupt requests may interrupt internal processes, interrupt requests having a high priority may interrupt execution of services granted to previous interrupt requests having a lower hierarchical priority level.

The latter feature has a remarkable impact on the physical structure of the computer. In fact, as it is known in the prior art, if interrupt requests do not have the power of interrupting external services, the central processor needs only physical resource to "remember" the status of the internal process which is interrupted (so as to be able to resume it,) and also needs sufficient physical resources to sustain a single external service. Vice versa, when interrupt requests have a reciprocal interrupting power on the basis of relative priority level, the physical resources to sustain the external services must be multiplied. For each input/output service, there must be means for accounting for the circumstances that an interrupt request of higher level on a different channel could interrupt the external process in the course of being serviced, so that the status of each external process must be "remembered." Such multiplication of physical resources is required in order to execute contemporaneously a plurality of external services, (according to a "time sharing" technique,) in which subsequent time intervals are assigned to the execution of a plurality of external processes. The multiplication of physical resources is generally expensive, because it is necessary to provide for each channel a whole set of registers and input/output paths for such registers controlled by suitable gating circuitry.

This problem is particularly important in data processing systems where many peripheral devices and control functions are performed by the central processor (instead of being performed by an external control unit). In this case, the complexity of the services to be performed is increased, and accordingly, the need for more complex physical resources dedicated to such services is also increased. Multiplication of physical resources may be reduced in part by using the main working memory as a physical support for the information to be remembered. However, there is the need to load into the memory and to read from the memory at each interrupt, a whole set of information requiring significant time and system overhead, thereby remarkably reducing system performance. Consequently, the main memory approach is used in very limited cases. Generally, it is preferred to use a plurality of registers dedicted to the different channels.

If complete performance equivalence is desired for each channel, (that is, the capability of connecting indifferently to each channel for any one of the different kinds of peripheral devices) multiplication of physical resources must be made so as to allow for keeping account of the needs of all the possible services. This involves a wasting of physical resources because, in general, a channel may transfer only one interrupt request for a service at a time, and for more services even if of different kind. Furthermore, different channels operate, in general, with different kinds of peripherals, each one with its own needs and its particular services, so that the assignments of a resource set for every kind of service to each channel constitutes a waste.

Even in the case of a specific peripheral, required resources will differ according to the specific requested service. For instance, a generic service for a character exchange will require more limited resources than is required for the service phase for preparing a character exchange in a disk or tape unit. Therefore, within a single channel, dedicated resources will be partly unused, i.e., idle for most of the time.

SUMMARY OF THE INVENTION

"Wasting" problems are obviated by the multichannel data processing system of the present invention. Physical resources are provided which are not dedicated to existing channels, but in addition, other physical resources are also provided, which are oriented to service classes and assigned to different channels during the time the channels need the resources. The invention allows for a substantial reduction in the requirement for physical resources, without introducing limitations in performance, thereby providing for a better utilization of the resources. The system according to the invention is used together with a channel priority network which is dynamically changeable, so that the priority and the interrupting power of an interrupt request generated on one channel can be modified according to the needs of the overall system.

The system according to the invention provides a minimum set of resources dedicated to each of the channels, which is sufficient to enable a data character exchange on each of the channels by a time sharing procedure. A plurality of specific resources is dedicated to a corresponding plurality of service classes, ordered according to a priority criterion and selectively assigned to the different channels depending on the priority level to the interrupt requests received from each channel.

According to another feature of the invention, while services of the same class are not reciprocally interruptible, services of different classes on different channels are hierarchically interruptible. This allows for interleaved parallel execution of as many services as there are classes and resources. The sole limitation is that services executed in parallel must be in different classes and on different channels. Accordingly, in a time sharing fashion and depending on the kind of service and its relative priority, as many input/outut processes as there are channels may be performed in parallel, provided such processes do not contemporaneously require the same resources. These and other characteristics will appear more clearly from the following description, made for exemplary and not limiting purposes, of a preferred form of embodiment and attached drawings.

BRIEF DESCRIPTION OF THE DRAWINGS

FIG. 7 shows a preferred embodiment of the priority network in the central processing unit according to the invention.

FIGS. 8, 8A and 8B show, jointly, a preferred embodiment of the control unit of the central processor unit according to the invention.

DESCRIPTION OF THE PREFERRED EMBODIMENT

Figure 1:
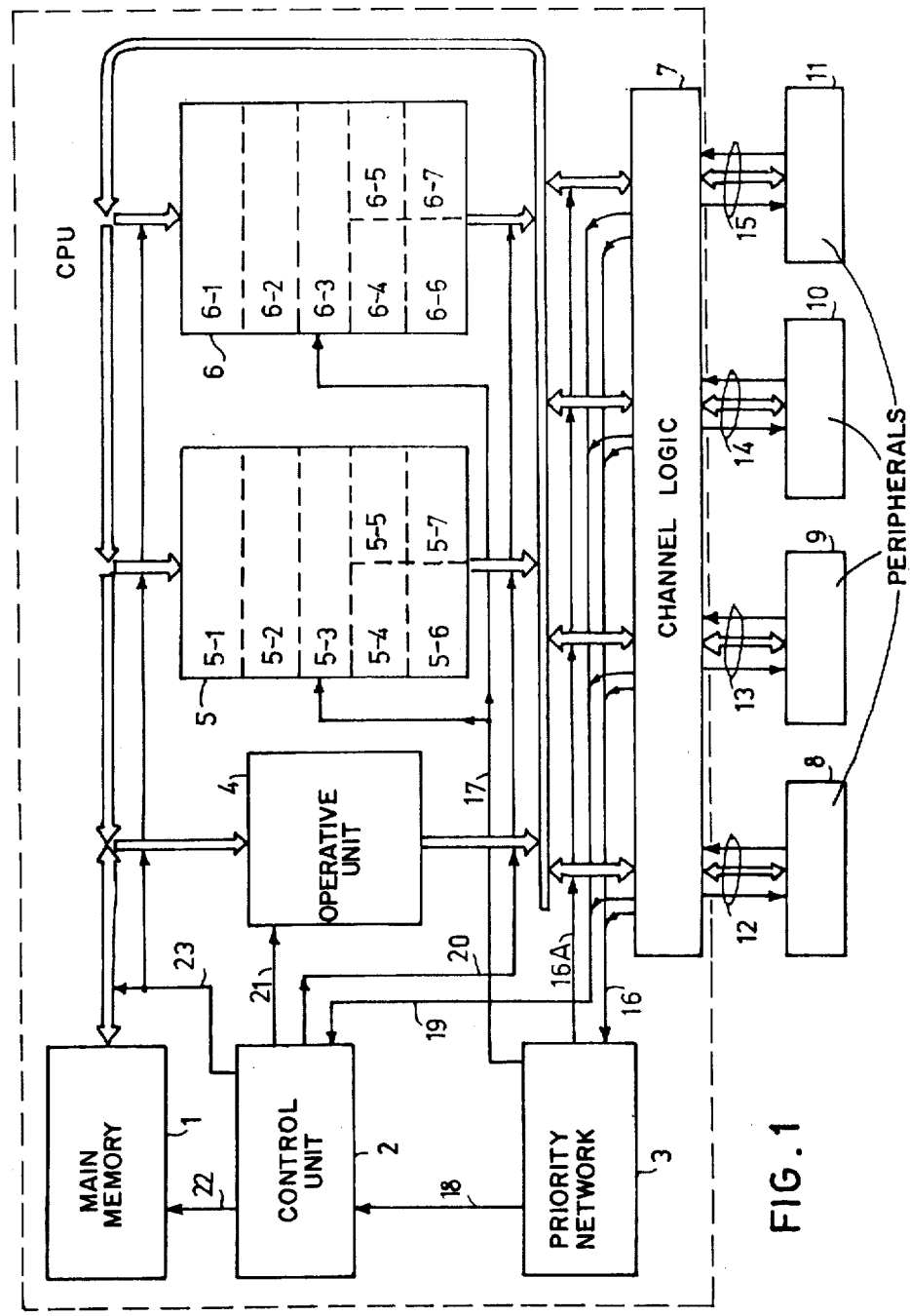
FIG. 1 shows the central processing unit of a data processing system according to the invention.

In order to more clearly point out the conceptual premises already considered and to better understand the elemplary form of embodiment, it is useful to first indicate some criteria which are used to classify I/O services and related interrupt requests. From a functional point of view, the I/O services may be classified as follows:

Service for Standard Character Exchange

This service involves relatively simple operations which provide exchange of a single character at a time. Each character to be transferred is accompanied by an interrupt request. The exchange or transfer operation is performed by executing a predetermined dialogue procedure.

Service for Special Character Exchange

This service involves operations by which the character exchange is necessarily associated with some check, control, or processing operation performed in the central processing unit. The operation may vary according to the circumstances, but in any case cannot be deferred. In such a class of services is included for instance, the search of "key character" in disk or drum peripheral units, where the character exchange is strictly associated with a comparison operation and such operation must be performed in the central processing unit. This occurs, for instance, when certain check and control functions are assigned to the central processing unit, which acts as an "integrated controller" for the peripheral unit.

Other Services

These services involve operations of various kinds, which do not involve external information support and are generally oriented to the initiation or termination of a command directed to the external unit, or to the monitoring of anomalous events which occurred on deactivated peripheral units. Generally, such services are requested without using the interrupt mechanism. All operations required to interface software with hardware fall within this class. For example, there are operations which enable software to communicate its needs to hardware, to recognize the result of previously requested operations or, generically, to recognize the status of the operative conditions of a peripheral unit.

From the point of view of urgency, the different services may be classified as:

—Services having a predetermined urgency degree;
—Services without a predetermined urgency degree.

In the first case, the service must be executed within pre-established time limits from the occurrence of the service interrupt request. This must be done in order to avoid serious and often irremediable consequences, such as the loss of information, the need to re-execute already performed operations, the introduction of unacceptable waiting times, etc. Of course, the degree of urgency may vary from peripheral unit to peripheral unit. In the second case, the interrupt request may be pending indefinitely without causing any problem.

From the point of view of time requirements, different services may be distinguished according to the time required for their execution. Short services are, for instance, the standard character exchange services which may be performed in a single memory cycle. Long services are those services which require a plurality of memory cycles to be performed, because, for instance, they require the reading from the memory of a program routine and/or the reading of an information set which must be examined or used and further logical or arithmetical operations which cannot be exhausted in a memory cycle.

The behavior of the central processing unit is cyclical in the sense that the electrical operations of connecting the different resources to each other, the loading of registers, the transfer of information from one register to another one, the writing or the reading from the memory of information by means of an addressing and read/write operation, etc. are performed with a predetermined timing which cannot be changed and which constitutes a machine cycle. The machine cycle cannot be interrupted. Once certain operations are initiated, it is not possible to interrupt and stop the cycle in order to start a new machine cycle during which different desired operations may be performed. If this were to occur, it would only be by reason of some fault. Therefore, short services, which by their nature need to use the central processing unit resources for only a single machine cycle are by their nature uniterruptible. On the contrary, the long services are potentially interruptible but the interruption must physically occur at the end of a machine cycle and consist of assigning the following cycle (or cycles) to the new service interrupt request by "freezing" the previous service. The interruption, if it is permitted, requires the existence of suitable resources to remember the status of the service which is interrupted.

The data processing system according to the invention provides physical channel resources which enable, on each channel, the execution of a standard character exchange service (which is a non-interruptible service). Each channel is provided with a certain number of registers specifically dedicated to and usable by that channel. The registers have a size sufficient to physically sustain the operation of standard character exchange. This enables the interleaved execution of as many I/O operations, each consisting of standard character exchanges, as there are channels. In other words, peripheral units are allowed to exchange standard characters with the central processor in time sharing fashion, provided the peripheral units are physically connected to different channels. The data processing unit also provides physical resources specifically assigned to service classes and selectively assignable to any one of the channels (or at least to a part of one). Each one of such resources together with a channel resource has a size sufficient to sustain the information set required for the execution of the related class of services. Such resources enable the interleaved execution of as many different services (one per class) as there are resources, thus allowing, within the frame of a single program, the contemporaneous execution of other tasks which require the intervention of other peripheral units.

Referring now to FIG. 1, a central processing unit connected to various peripheral units, and capable of controlling I/O operation in an integrated way, (that is by means of resources internal to the central processing unit) is shown. The central processing unit is comprised of a working memory or main memory 1, a control and command generation unit 2, a priority network 3 for receiving and recognizing the interrupt requests forwarded by the various peripheral units, an operative unit 4 for the execution of logical and arithmetical operations, two working register banks 5 and 6, interface registers and channel logical circuits in number equal to the number of I/O channels, indicated in the whole as channel logic 7, and a distribution network, for distributing signals, data, and commands, which selectively connect each of the various above-mentioned elements. The channel logic 7 connects the central processing unit to a certain number of peripheral units 8, 9, 10, 11 through the input/output channels 12, 13, 14, 15.

The priority network 3 in response to signals received from the channel logic through a set of wires, represented for sake of clarity by wire 16, assigns service execution to the channel which has issued the request having the highest priority. This is done through signals forwarded on a set of wires, represented for sake of clarity by single wire 16A. In case there are not any interrupt requests from the peripheral units, the service is attributed to the central processing unit which proceeds in the execution of internal operations, that is, in the execution of a working job which does not involve the intervention of peripheral units. In addition, the priority network 3 selects the resources needed by the required service and by the requesting channel by forwarding suitable signals on wires represented by line 17. The control unit, depending on signals received from the priority network over line 18 and from the channel logic over line 19, and depending on information contained in the selected resources, or received from the working memory, generates elementary commands which control the operation of the central processor by closing and opening communication paths, activating the operative unit and enabling it to execute operations required to perform the requested services. The control function is schematically represented by connections 20, 21, 22, 23, which forward commands to other units. If the service can be interrupted, the priority network may, on signal from a different channel, stop execution and request the control unit to first execute the higher priority service requested by the other channel. Due to the limit of the resources and in order to avoid the loss of information contained in the registers, a channel cannot request two services at the same time. (The second service must always wait for the termination of the first one, even if it has higher priority.) Nor can a channel interrupt the execution of a service on another channel with a service interrupt request of the same class. (The new channel would have to wait for the termination of the service on the other channel).

As shown in FIG. 1, the bank registers 5 and 6 are divided into groups. Register groups 5 - 1 and 6 - 1 are devoted to the execution of special character exchange services and high priority services. Register groups 5 - 2 and 6 - 2 are devoted to the execution of low priority services. Register groups 5 - 3 and 6 - 3 are devoted to the execution of internal operations (internal computation). Register groups 5 - 4, 5 - 5, 5 - 6, 5 - 7 and 6 - 4, 6 - 5, 6 - 6, 6 - 7, are devoted to the execution of standard character exchange on each one of the four channels 12, 13, 14, 15. This arrangement means that in the preferred embodiment shown in FIG. 1, either a special character exchange or a high priority service may be performed at the same time (but not both), but a high priority service and a low priority service may be contemporaneously executed in a interlaced fashion, together with standard character exchange on the two remaining channels. Alternatively, a high priority service may be executed in an interlaced fashion with standard character exchange on the remaining three channels, or a low priority service and standard character exchange on the remaining three channels. The constitutive elements of the computer will be now considered more in detail.

THE INTERCONNECTING CHANNELS.

Figure 2:
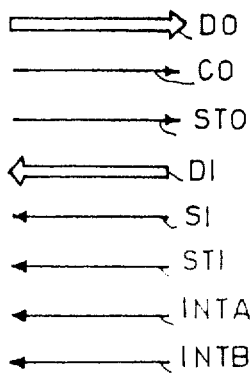
FIG. 2 shows an interface for connection of the central processing unit to a peripheral device.

FIG. 2 shows in diagram form and for exemplary purposes the structure of an input/output channel such as 12, 13, 14, 15.

In FIG. 2, the wires indicated by DO, nine in number, represent a path for parallel data transfer of binary coded information of 8 bits plus a check or parity bit. The arrow, directed towards the right indicates that information is coming out from the central processing unit. The wire indicated by CO is used to forward to the peripheral unit a signal which characterizes the information on channel DO as a command or a peripheral unit address as opposed to a single datum. The wire indicated by STO is used to forward to the peripheral unit a timing pulse or "STROBE" signal. The signals on path DO and wire CO are effectively sensed only when such a pulse is present. Likewise, path DI is used to send to the central processing unit binary coded information and wire SI is used to send to the central processing unit a signal which characterizes the information on path DI as a peripheral unit status. Wire STI is used to transfer a STROBE signal to the central processing unit. Wire INT A is used to forward an interrupt request signal of a first kind, for instance to request the central processor to monitor particular events or peripheral units status and generally to request the execution of predetermined services. Wire INT B is used to forward an interrupt request signal of a second kind, for instance to request the central processor forward or receive a character. By this arrangement, it is apparent to those of ordinary skill in the art that the computer may fulfill two different kinds of requests: generalized service requests and character exchange requests. It is also obvious to those of ordinary skill in the art that this is given for exemplary purposes only and, in general, it is possible to use a single signal for interrupt request as well as a plurality (greater than two) of interrupt request signals presented on different wires. However, the utilization of a specific character exchange interrupt request is useful because it enables the system to be free of the need to have each character exchange preceded by the execution of a complicated dialogue or service intended to identify the specific reason for which the interrupt request is forwarded, and thus makes the character exchange a quick and simple operation.

The set of wires and signals above-described is called an "interface" or channel interface. With each channel interface is associated, in the central processor and in the peripheral control units, a certain number of suitably timed registers intended to physically sustain the received or transferred information. Such resources on the side of the central processor, have already been named "channel logic". Before considering more such channel logic in detail, it is useful to describe briefly by way of example how a dialogue may be performed in an interface and how it may be timed.

Suppose a peripheral unit wants to communicate to the central processor its status. To achieve this end, it forwards to the central processor an interrupt request INTA. (The same name is used for signals and wires which convey them.) Referring now to the timing diagram of FIG. 3, it may be seen that at instant $t_1$, signal INT A rises from logical level 0 to logical level 1. After a certain interval, which depends on whether the central unit is busy in performing operations having priority higher than the one of the interrupt request, the central processor in response to said interrupt request forwards on channel DO a command, accompanied by a characterizing signal on wire CO and by a timing signal on wire STO.

Figure 3:
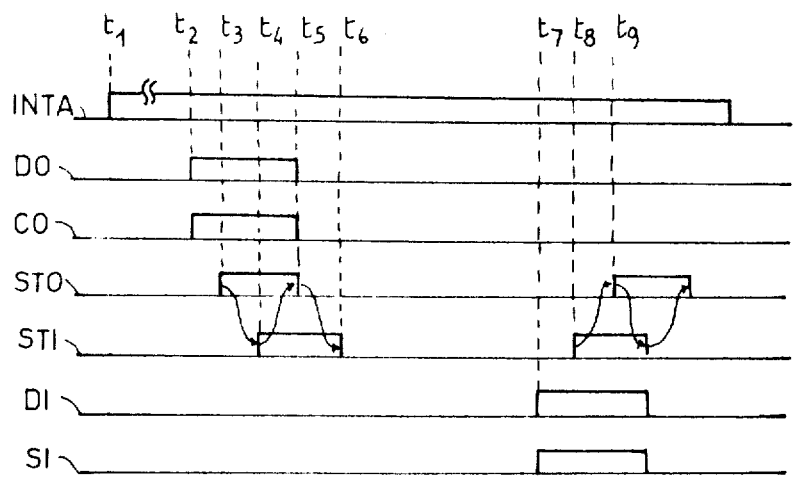
FIG. 3 shows, in a timing diagram, a dialogue through an interface.

In timing diagram FIG. 3, it may be seen that at instant $t_2$, signals DO and CO rise from logical level 0 to logical level 1, and the same rise occurs at instant $t_3$ for STO. As soon as the peripheral unit receives (the rising front of signal) STO, it loads the received command in an input register and forwards a response signal, which may be signal STI (at instant $t_4$). As soon as the central processor receives signal STI, it lowers the signals present on wires DO, CO, STO (at instant $t_5$) and thereafter the peripheral unit lowers signal STI (at instant $t_6$).

If required, the central processor may forward additional commands by means of the same timing mechanism. Such commands may, for instance, request the peripheral unit to send its coded name and the causes for which the interrupt request has been sent. Once the required commands have been received and processed by the peripheral unit, it forwards on channel DI the required information. In FIG. 3, it may be seen that at instant $t_7$ a character is forwarded on bus DI accompanied by characterizing signal SI and, with a suitable delay, by timing signal STI (at instant $t_8$). As soon as signal STI is received, the central processor loads the information present on bus DI into a suitable input register and forwards a response signal which may consist of signal STO (at instant $t_9$). When signal STO is received, the peripheral unit lowers the signals on bus DI, signal SI and signal STI. If additional data must be forwarded, the procedure is repeated. The central processor forwards new command requesting information (signals DO, CO, STO, STI) and the peripheral unit provides an answer. Once the exchange of information is completed, the peripheral unit lowers the interrupt request signal INT A.

In the case of the central processor requesting the intervention of a peripheral unit, the initiative is taken by the central processing unit with the already-indicated procedure. The only difference resides in the absence of signal INT A. The above-described procedure may be used to start a data transfer sequence to or from the central processor. A command phase like the one considered is then followed by a transfer phase which may be performed in the following way.

Figure 4:
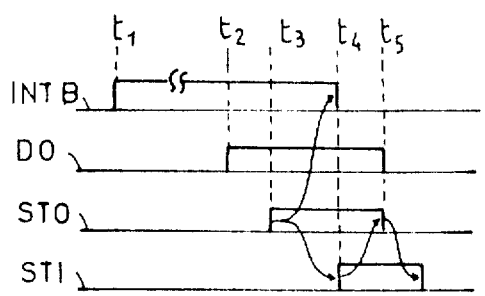
FIG. 4 shows, in a timing diagram, a dialogue through the interface for a data exchange from the central processor to a peripheral device.

Referring to FIG. 4, as soon as the involved peripheral unit is ready to receive a character, it forwards a request on wire INT B (at instant $t_1$). When the central processor is available to honor the request (which depends on operations the central processor is already performing or has to perform which have higher priority), it forwards a character on bus DO (at instant $t_2$) accompanied by timing signal STO (at instant $t_3$). The peripheral unit immediately accepts the character, lowering the interrupt request INT B and forwarding an answer signal STI (at instant $t_1$). Following that, the central processor lowers the signals on bus DO and on wire STO (at instant $t_5$). When the peripheral unit is ready to receive another character, it again raises the interrupt request signal INT B and so on.

Figure 5:
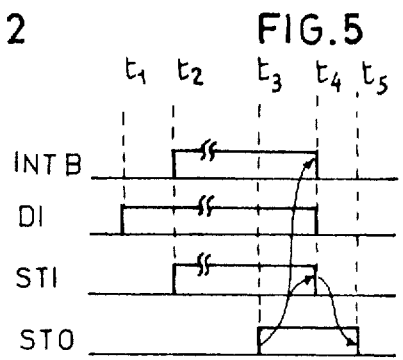
FIG. 5 shows, in a timing diagram, a dialogue through the interface, for data exchange from a peripheral device to the central processor.

In case the data transfer is directed towards the central processing unit, the exchange mechanism is similar. Referring to FIG. 5, as soon as the peripheral unit is ready to forward a character, it put it on bus DI (at instant $t_1$), and accompanies it with signals INT B and STI (at instant $t_2$). As soon as the central processor is ready to receive the character, it does so and answers the peripheral unit by raising STO (at instant $t_3$). As soon as the peripheral unit receives signal STO, it lowers the interrupt request INT B, signal STI and the signals on bus DI (at instant $t_4$). The central processor answers by lowering signal STO (at instant $t_5$). When the peripheral unit is ready to forward a new character, it sends a new interrupt request INT B.

In FIGS. 3, 4, 5, the arrows which connect in succession the different leading or falling fronts of the signals indicate the interdependence of the signals. However, it is clear that from the instant in which the interrupt request is presented to the instant in which the request is honored, whether the request is for a service or for a character exchange, a relatively long time interval may occur, due to the fact that the central processor may be busy performing operations having higher priority.

THE CHANNEL LOGIC.

Figure 6:
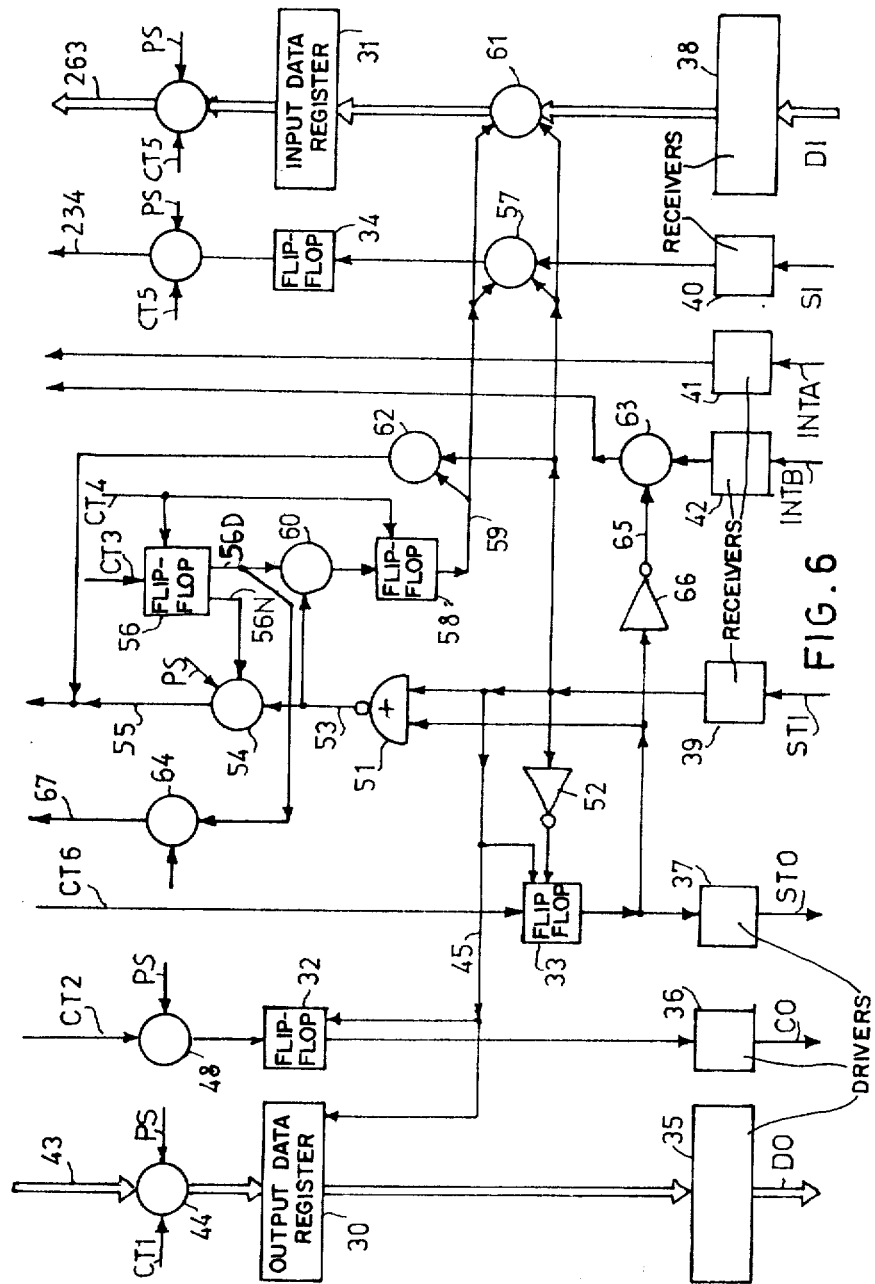
FIG. 6 shows the channel logic which supervises the signal exchange in an interface.

FIG. 6 shows in diagram form the channel logic, that is, the set of registers and logical circuits which enable for each channel, the execution of the interface dialogues already described. The channel logic comprises for each channel, an output data register 30, having, for instance, a capacity of 9 bits, an input data register 31, having the same 9 bit capacity, a flip-flop 32 for generating signal CO, a flip-flop 33 for generating signal STO and flip-flop 34 for storing signal SI.

The output signals of register 30 and flip-flops 32, 33 are connected to driving circuits 35, 36, 37 provided for feeding lines DO, CO, STO. Likewise, signals DI, STI, SI, INTA, INTB are received from their respective interface wires through suitable line receivers 38, 39, 40, 41, 42. The outputs of receivers 41 and 42 forward directly the signals INT A, INT B to the priority network. Receivers 38, 40 on the contrary, forward the input data and signal SI to register 31 and to flip-flop 34 respectively.

The output logic will now be considered. The output data register 30 is connected to the working register of the central processor through channel 43 controlled by the set of AND gates 44. The AND gates 44 are enabled by a channel select command PS received from the priority network (PS is present during a whole machine cycle if such cycle is assigned by the priority network to such channel), jointly with a timed microcommand CT1 received from the control unit. In case the initiative to activate a channel is taken by the central processor, the command PS is generated by a suitable microcommand rather than by the priority network. When CT1 and PS are both present, the data present on channel 43 is loaded into register 30. Register 30 may be reset by the rising front of signal STI applied on wire 45. Flip-flop 32 is jointly set by a timed microcommand CT2 and by signal PS, both applied to AND gate 48. When set, flip-flop 32 generates signal CO. Flip-flop 32 is reset by the rising front of STI applied on wire 45.

Generation of signal STO is obtained by means of flip-flop 33. A timed microcommand CT6, suitably delayed relative to CT1, but generated in the same machine cycle, is applied to the clock input of flip-flop 33 and raises the STO signal. Flip-flop 33 is reset alternatively by the rising front of signal STI or by the rising front of signal $\overline{STI}$ obtained by STI through inverter 52. STI and $\overline{STI}$ are applied to suitable reset inputs of flip-flop 33 and each causes the fall of STO.

Considering now the input logic, STI is used for the reset function already described and additionally is applied to a first input of NOR gate 51, whose second input is connected to the output of flip-flop 33. The output 53 of NOR gate 51 is therefore at logical level 1, only in the absence of both signals STO and STI. The output 53 of NOR gate 51 is forwarded to the control unit through wire 55, if gate 54 is enabled. AND gate 54 is enabled by signal PS and by a signal received from flip-flop 56. Flip-flop 56 indicates the direction of the information transfer on the interface and is set by a timed microcommand CT3 and reset by a timed microcommand CT4. By way of example, the set status may correspond to a transfer direction from the peripheral unit to the central processor. When flip-flop 56 is reset, its inverted output 56N enables AND gate 54 and the condition signal, if present on wire 53, may be applied to wire 55. The function of such a condition signal is the following.

It may be observed that in data transfer phase towards the peripheral unit, the dialogue is developed with a timing independent from the internal timing of the central processor. Once the central processor by means of microcommands CT1, CT2, CT4, CT6 has provided in one machine cycle the loading of register 30 and the setting of flip-flops 32, 33, and 56, the information exchange on the interface is performed with its own timing. The microprogram, which in the central processor supervises the information exchange and which evolves with the timing imposed by the machine cycle, places itself in a recycling status; that is, if there are no services of higher priority to execute by the central processor, the central processor waits for the effective transfer to the peripheral unit of the information placed on the channel. This condition is verified when both signals STI and STO are at logical level 0. At this point, another character may be forwarded. Accordingly, the microprogram which supervises the character transfer cyclically monitors the condition present on wire 55. When the signal on wire 55 is at logical level 1, the microprogram evolves from the cyclical status and proceeds in the following phases.

Reconsidering signal STI, it may be seen that it is applied to the input of AND gates 61 and 57 which control the loading of register 31 and flip-flop 34. Another control signal is applied to the inputs of such gates by flip-flop 58 through wire 59. Flip-flop 58 is set by the rising front of the signal present at the direct output 56D of flip-flop 56 through the gate 60 controlled by signal present on wire 53. Flip-flop 58 is reset by the timed microcommand CT4. The output of flip-flop 58 is additionally connected to an input of AND gate 62 which enables the transfer of signal STI on the condition wire 55.

The function of the above-mentioned is the following. When the central processor forwards to the peripheral unit a command in order to receive information, flip-flop 56 is set by microcommand CT3. At the same time microcommands CT1, CT2, CT6, provide commands to load and transfer information to register 30. The transfer occurs with the timing previously described. In such a case, the executive microprogram must place itself in cyclical operation and wait for the reception of the character from the peripheral unit, which is signalled by the raising of signal STI when STO is absent (FIG. 3 at instant $t_8$). Therefore, the STI signal which must be detected is not the one received as an answer to the forwarding command (FIG. 3 at instant $t_4$), which is masked by NOR gate 51.

At the end of the command transfer phase, and AND gate 60 is enabled, thus setting flip-flop 58. The signal STI received in the following is therefore transferred on wire 55 through AND gate 62 enabled by the output of flip-flop 58. At the same time, signal STI and the output of flip-flop 58 enable the loading of register 31 and the setting of flip-flop 34. When the microprogram recognizes the presence of the signal on wire 55, it generate microcommands CT5, CT4, CT6 respectively in order to transfer the information received to a suitable working register of the central processor, to reset flip-flop 56, 58 and to generate the answer signal STO. The prosecution of the microprogram is at this point conditioned again by the condition signal on wire 55. The signal rises again only when STO is lowered. The described structure is therefore capable of performing the dialogue shown in FIG. 3.

It has been said that once a data transfer operation is started, it may continue with a simplifid dialogue structure. For data transfer from the central processor, we reconsider jointly FIG. 4 and FIG. 6. The peripheral unit forwards an interrupt request INT B. This request is transferred to the priority network, which, if no interrupt requests of higher priority are in course. assigns the machine cycle to the interrupting channel by generating signal PS. The control unit generates microcommand CT1, CT6 and loads register 30 with the character to be transferred. The transfer occurs with the already seen autonomous timing. During the transfer, signal INT B on the interface is masked by the signal present on wire 65, which is obtained by inverting (inverter 66) STO and controls AND gate 63. Therefore, in the subsequent machine cycles, the central processing unit is free to dedicate itself to the execution of other operations even if they have lower priority. Once the character transfer has been performed and STO has been lowered to logical level 0, the peripheral unit may forward a new interrupt request INT B and the cycle is repeated.

In case of data transfer to the central processor, the behavior is similar. During the phase which prepares the data transfer, flip-flops 56 and 58 are set. The direct output 56D of flip-flop 56, in addition to conditioning the channel logic, is applied to an input gate 64. The output 67 of gate 64, when enabled by signal PS, is forwarded to the control unit for a reason which will be seen later. When the peripheral unit is ready to send a character, it places it on the interface and forward signals STI and INT B. Consequently, the character is loaded in register 31.

When the interrupt request is sensed and accepted by the priority network, a channel is selected by signal PS. At the same time, the control unit generates microcommands CT5 and CT6 and transfer the characters from register 31 to a suitable working register and also generates signal STO. For the whole duration of signal STO, signal INT B, if present on the interface, is masked by the signal on wire 65 which is at logic level 0. Once signals INT B, STI, STO have been lowered to logical level 0, the peripheral unit may forward another interrupt request INT B and the cycle is repeated. End of data transfer may be indicated in this dialogue sequence by forwarding signal CO or SI together with the last transferred character.

THE PRIORITY NETWORK

FIG. 7 shows an exemplary embodiment of the priority network. As seen for each channel, the channel logic is connected to the priority network by means of two wires, one for sending service interrupt requests, the other for sending character exchange interrupt requests. Accordingly, in FIG. 7, they are indicated as input wires INTA 1, INTA 2, INTA 3, INTA 4, INTB 1, INTB 2, INTB 3, INTB 4. The ordered digit assigned to each wire indicates the corresponding channel. Wires INTA 1, INTA 2, INTA 3, INTA 4, are applied to a set of switches 90 (preferably of the electronic type and individually controlled,) which switch the connection of such wires onto the wires 101, 102, 103, 104 or onto wires 105, 106, 107, 108 respectively. The set of switchs 90 may be controlled manually or by the central processing unit by means of electronic circuits. The U.S. Pat. No. 3,925,766 filed on Nov. 27, 1973 and issued on Dec. 9, 1975 shows a system for assigning a variable priority to different channels dynamically controlled on command from a central processor.

A fixed relative-decreasing priority is attributed to wires 101, 102, 103, 104. Interrupt requests forwarded on wires 101, 102, 103, 104 are interpreted as interrupt requests for a class of services having high priority, which will be called "Fast Services." A fixed relative-decreasing priority at a level lower than the preceding one is attributed to wires 105, 106, 107, 108. Interrupt requests forwarded on such wires are interpreted as interrupt requests for a class of services having a lower priority, which will be called "Slow Services." Thus, the switching network 90 selectively interprets the interrupt requests on wires INTA 1, INTA 2, INTA 3, INTA 4, as requests for Fast Services or Slow Services. It is clear that the exemplary embodiment above described is not the only one which may be used. For instance, each interface channel could have a plurality of wires for sending interrupt request of different classes. Also, previous interposition of circuit elements such as the receiver 42 and the AND gate 63 shown in FIG. 6, (which are not represented in FIG. 7,) constitute a third priority level for character exchange requests to which a priority higher than the preceding ones may be attributed.

Signals present on wires 101 . . . 104 are stored in a register 113 at an instant defined by a pulse SET 1, periodically forwarded by the control unit at the end of each machine cycle. Signals present on wires 105 . . . 108 are stored in a register 114, at an instant defined by a pulse SET 2, simultaneous to SET 1 and forwarded by the control unit. Signals present on wires INTB 1 . . . INTB 4 are stored in a register 115 at an instant defined by a pulse SET 3, simultaneous to SET 1 and forwarded by the control unit.

The outputs of register 113, 114, 115, numbered from 126 to 137, are connected to corresponding inputs of a logical exclusion matrix 91, whose structure is well known in the art. (It is described in the above-cited patent.) The function of such logical matrix is to enable the transfer to one of the outputs, numbered from 141 to 152; specifically, the signal among all of those presented as inputs which has the highest priority. Therefore, while a plurality of interrupt request signals may be contemporaneously present on wires 126 . . . 137, only one signal will be present on wires 141 . . . 152, corresponding to the one which has the highest priority.

As already seen, the interpretation and the honoring of an interrupt request implies, at least for service requests, a complex dialogue which develops in a time interval composed of a plurality of machine cycles. If the SET signals (SET 1, SET 2, SET 3) enable the loading of registers 113, 114, 115 at each machine cycle, it would be possible that each service or character exchange (if it requires more than a machine cycle) be interrupted by the raising of an interrupt request having higher priority. Since, as we will see later, specifice resources are provided for each service class and for character exchange, it is necessary to render uninterruptible certain interruptions by means of suitable conditioning networks. In particular, if for a character exchange, the need of a plurality of machine cycles is foreseen and single control resources are provided for such a class of operations, it is necessary that operations of character exchange be reciprocally uninterruptible. Again, if single control resources and supporting registers are provided for the whole class of Slow Services, it is necessary to render reciprocally uninterruptible the whole set of slow service interrupt requests. Finally, if single control resources and supporting registers are provided for the whole class of Fast Services, it is necessary to render reciprocally uninterruptible the whole set of fast services requests.

Referring now to FIG. 7, required conditioning networks are shown. The output 102 of the switching network 90 and the corresponding output 142 of the exclusion matrix 91 are connected to the input of AND gate 92. Likewise output 103 and the corresponding output 143 are connected to the inputs of AND gate 93 and the outputs 104 and 144 are connected to the outputs of AND gate 94. The outputs of AND gates 92, 93, 94 are connected to corresponding inputs of a NOR gate 95, whose output through AND gate 96 controls the enabling of register 113 by SET 1.

If one or more interrupt requests arise on any one of wires 101, 102, 103, 104 and register 113 was previously void, the first signal SET 1 which occurs enables the loading of register 113. Consequently, the interrupt request having higher priority appears on the corresponding output wires of matrix 91. From this instant, any subsequent SET 1 signal is inhibited by the conditioning network until the fall of the interrupt request which is being honored. Other subsequent interrupt requests of higher relative priority in the same class cannot be sensed until the previous request is serviced.

On the other hand, interrupt requests having a lower priority whichh have been sensed contemporaneously are masked by the exclusion matrix unitl there is present an interrupt request of higher priority. Therefore, the interrupt requests on wires 101 . . . 104 are mutually uninterruptible even if they can interrupt and prevail over interrupt requests presented at a lower class of priority, for instance on wires 105, 106, 107, 108. A conditioning network identical to the preceding one, although not represented makes the interrupt requests for slow sevices mutually uninterruptible.

Signal SET 3 may be simply conditioned through AND gate 100, by a signal, inverted by NOT element 163 on wire 97 which indicates that a character exchange is in the course of being serviced.

Wires 141 . . . 144 are grouped through OR gate 98 on wire 99. An interrupt signal will appear on this wire which is indicative of a fast service. Such signal is forwarded to the control unit and the operative unit for selecting the resources dedicated to the fast services (wires 17 and 18 of FIG. 1). Similarly, wires 145 . . . 148 are grouped through OR gate 153 on wire 154 and wires 149 . . . 152 on wire 156 through OR gate 155. These wires are used to forward to the control unit and to the operative network interrupt signals indicative of a slow service request or a character exchange respectively.

In addition, wires 141, 145, 149 are gated, through OR gate 157 into wire 158. A signal indicating selection of first channel priority will therefore appear on wire 158. This signal corresponds to signal PS of FIG. 6. Similary, wires 142, 146, 150 are gated through OR gate 159 into wire 160 where a signal will appear indicating selection of the second channel. In the same manner, wires 143, 147, 151 are gated through OR gate 138 into wire 161 and wires 144, 148, 152 into wire 162 through OR gate 139. The channel selecting wires 158, 160, 161, 162 are connected to the channel logic of each respective channel and provide the corresponding channel selecting command similar to PS of FIG. 6. Additionally, they are connected to the operative network for providing suitable commands for selection of the resources dedicated to each channel.

THE CONTROL UNIT

Figure 8B:
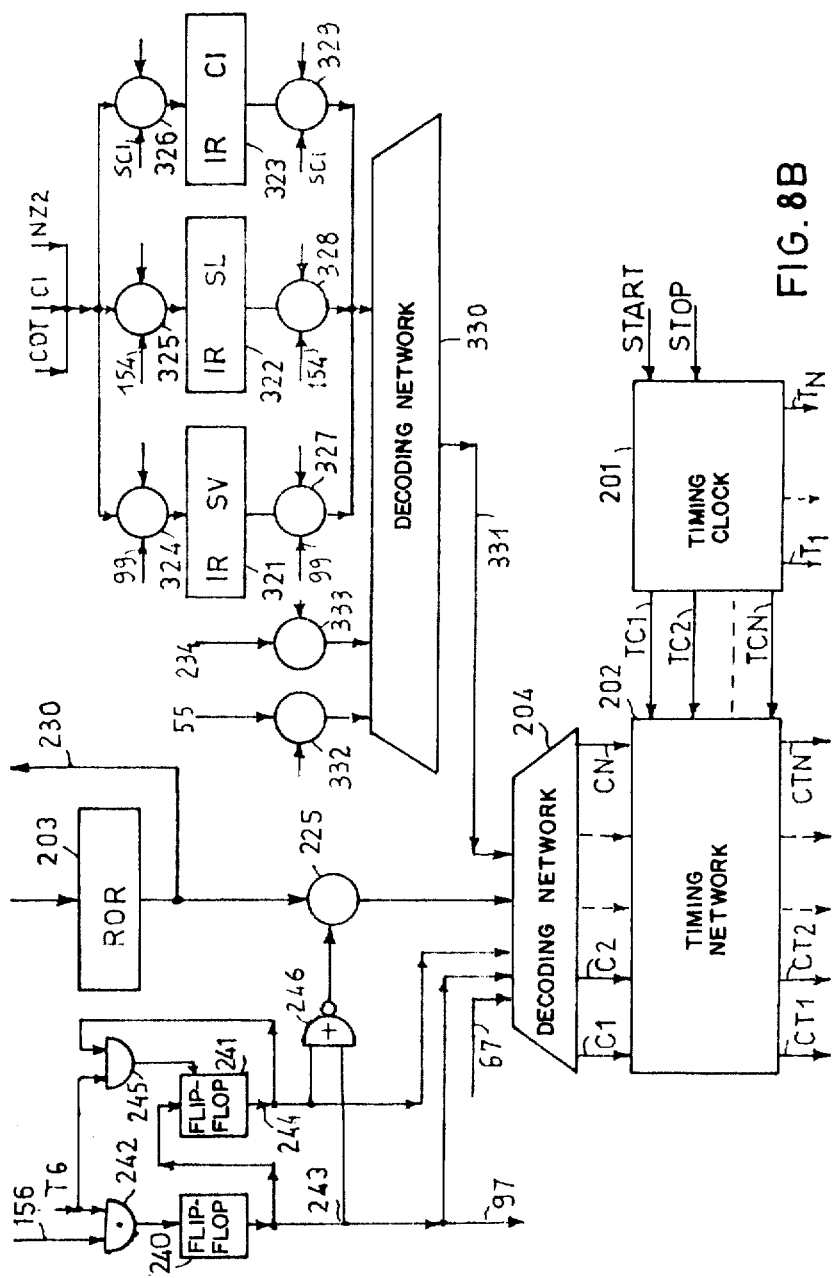

FIGS. 8, 8A and 8B show, in block diagram form, the control unit of the computer. The control unit comprises substantially a control memory 200 (FIG. 8A) which may be a read only memory or ROS, a timing circuit 201 and a timing network 202 (FIG. 8B). For sake of clarity, it is convenient to first consider the timing circuit 201 and the timing network 202.

The timing circuit 201 may suitably comprised of a delay line having intermediate taps fed by a univibrator which is triggered by an external START signal and by the output of the delay line itself so as to cyclically generate a sequence of timing pulses. Alternatively, it is possible to use a high frequency oscillating circuit for generating a base frequency. By passing the base frequency through dividing networks, it is possible to obtain a sequence of timing pulses. The operation of the timing circuit may be stopped at the end of each cycle by means of stop command applied to a STOP input.

Some of the timing pulses are transferred, through the outputs $T_1, T_2, T_3 \ldots T_N$ directly to several points of the computer where they cyclically control the opening/closing of predetermined AND gates. Other timing pulses TC1, TC2 . . . TCN are applied to the timing network 202.

Figure 9:
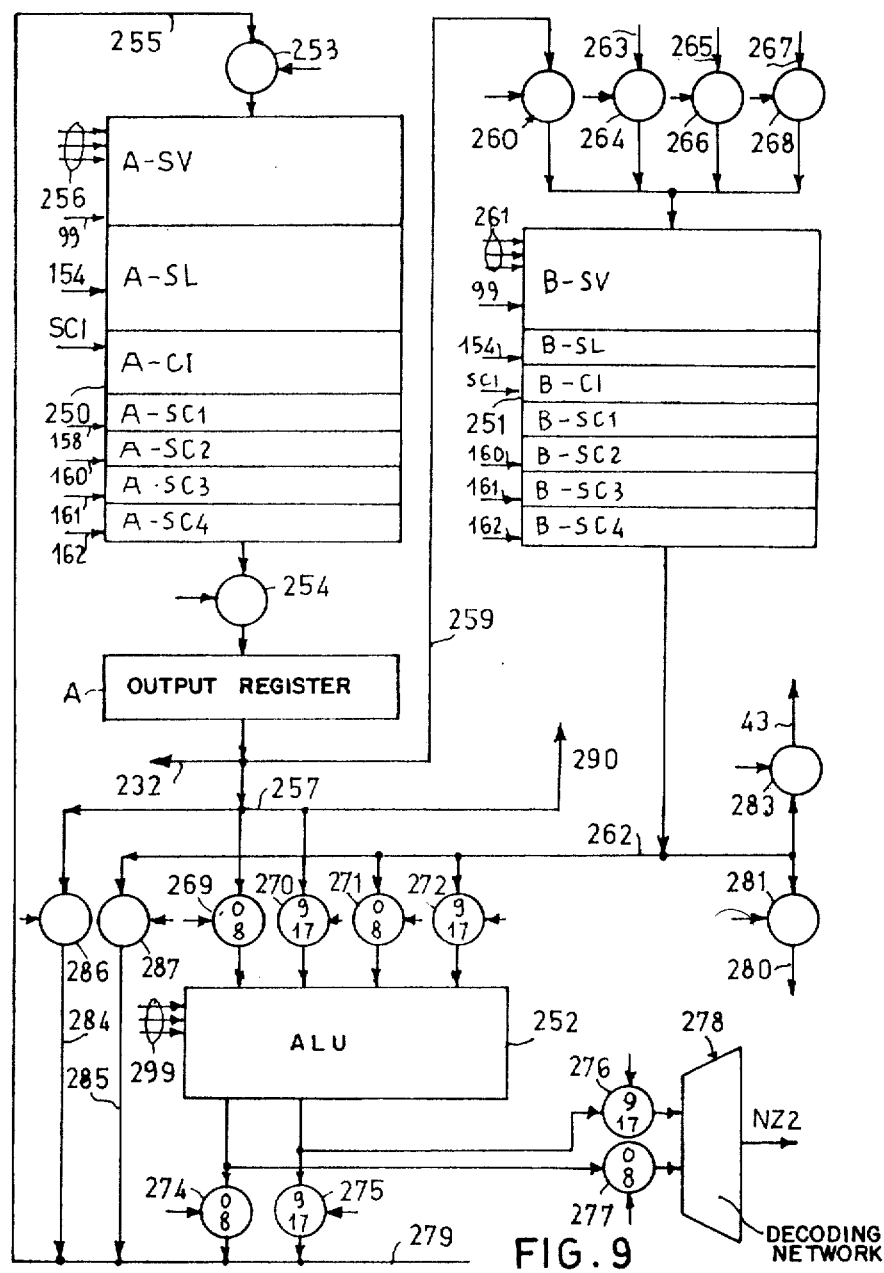
FIG. 9 shows a preferred embodiment of the operative section of the central processor according to the invention.
Figure 10:
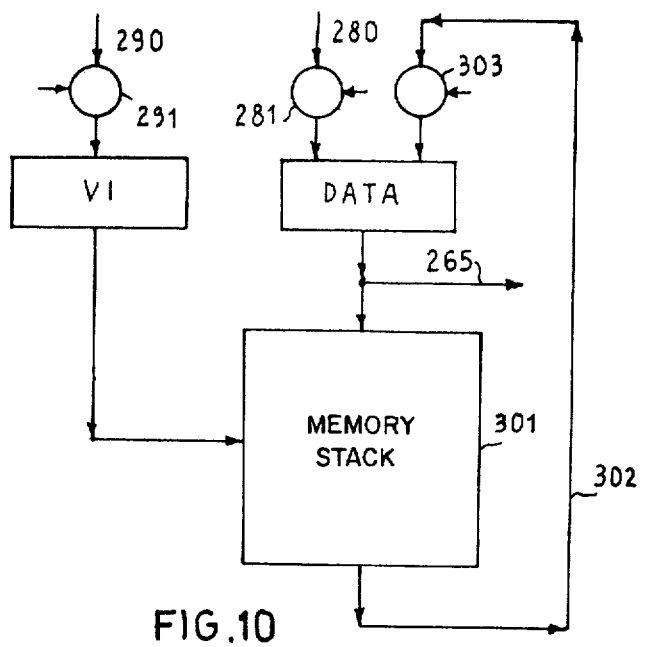
FIG. 10 shows a preferred embodiment of the main memory in the central processor.

The timing network receives from the control unit a set of signals or microcommands $C_1, C_2, C_3 \ldots C_N$. The microcommands $C_1 \ldots C_N$ are passed through a plurality of AND gates controlled by the timing pulses TC1 . . . TCN, which generates a plurality of suitably timed microcommands having suitable durations, CT1, CT2, CTN. These timed microcommands are distributed by a suitable command distribution network, not shown, suitable points of the computer, including the control unit, the operative network, and the memory unit. In FIGS. 8, 9 and 10, the representation of an arrow an input to any gating element (generally represented by a circle), will indicate, unless otherwise specified, that through the path represented by the arrow, ere is applied a suitably timing signal $T_1 \ldots T_N$ or a iitably timed microcommand CT1 . . . CTN. The fference between timing signals and timed microcommands is that the timing signals are always generated in ich machine cycle. (In fact, the timing signals are in way conditioned.) In contrast, the timed microcommands CT1 . . . CTN are generated in a specific cycle ily if in that cycle the corresponding microcommands 1 . . . CN are present.

The control unit also comprises an output register OR 203 for the ROS memory 200, a decoding network 204, and a plurality of addressing registers 205, )6, 207, one for each class of service. The register :signated ROSAR SV and numbered 205 is for the st service class. The register designated ROSAR SL id numbered 206 is for the slow service class.

Additionally, there is provision of a register designated ROSAR CI an numbered 207 which is used to ore the address of the microprogram which supervises ie internal computation. It would also be possible to ovide a register for the character exchange operation, but since such operation requires a limited number of microinstructions, it is preferable to generate ich microinstruction with a hardware sequencer, as ill be seen later.

The control unit also comprises an auxiliary address :gister designated ROSAR 1 and numbered 208, a ounting or incrementing network 209 for incrementg ROS addresses, and a two-cell binary counter or irdward sequencer. The ROS memory contains biiry microwords each having, for instance, 18 bits, rganized into microprograms which control the operaon of the computer. The microwords are called out, hen required, by program instructions (i.e. primitive structions) or by particular events which may occur the central unit.

AND gate sets control the signal transfer over the ommunication paths and are represented by circles 11 . . . 225. Each gate set is controlled by a timing ilse $T_i$ or by a timed microcommand $CT_j$. Each gate t receives as inputs and, when enabled, transfers to ie output a plurality of suitable signals onto wire sets hich are represented by a single wire and named in ie following as paths. On path 226, controlled by ND gate set 211, it is possible to load a single set presentative of a pre-established ROS address in nary form. Such address may be obtained by comiter initialization loading, which may be done, for stance, by means of console keys or suitable electrial command signals. Specifically, during a computer itialization phase, it is possible to load into registers )5 and 206 via gate sets 211, 215, 216 the starting ldresses of the microprograms which supervise execuon of fast service interrupt request and slow service terrupt request respectively. It is possible to return itomatically to these addresses once the micropro-ams have been executed.

AND gate sets 215, 216, 217 as well as gate sets 218, 19, 220 are controlled respectively by a fast service gnal SV received from wire 99, by a slow service gnal SL received from wire 151, by an internal comitation signal SCI (generated for instance when the previous two are absent). The address present at point 231 may therefore be loaded selectively into one of the registers 205, 206, 207 according to the presence or absence of the above-cited signals.

As soon as the gate set 221 is enabled (by a suitable timing signal), the ROS memory 200 is addressed. A microword is read out and transferred through the gate set 223 into ROR register 203. The same microword present at the output of register 203 is transferred through gates 225 to the decoding network 204 in order to generate suitable microcommands.

The ROS address contained in any one of the registers 205, 206, 207 may be updated in various ways. It may be loaded through the gate set 222 into register ROSAR 1 and then into the incrementing network 209, where, for instance, it is incremented by one. The updated address is then reloaded into the selected addressing register through path 229 and gate set 214. Alternatively, the address may be incremented of a suitable quantity K indicated by the microword present in register ROR 203 and applied to the incrementing unit 209 through path 230 and gate set 224. In another alternative, the new ROS address may be obtained by the microword read out from ROS and contained in ROR. A certain number of bits may be transferred through path 230 and gate set 213 to point 231. From point 231, it is passed through the selectively activated gate set 215 or 216 or 217 into the desired ROSAR register.

A further addressing capability is obtained through path 232 controlled by gate set 212. Path 232 enables loading the selected ROSAR register with the contents of an A register. (The A register is one of the working registers contained in the operative unit of the computer which will be later described.) Since the contents of such register A may come, as it will be seen, from other registers of the operative unit, from peripheral units as well as from the working memory, ROS addressing may be performed using ever information source within the computer or connected to it.

In the control unit described above, the function of microcommand generation is not assigned exclusively to the microprogram memory ROS. It is preferable to use a hardware sequencer to control the character exchange operation, even if it would be possible to provide a ROSAR register and a microprogram for this specific purpose. In fact, the character exchange operation requires within the central processor the execution of very simple elementary operations which may be performed in a very limited number of machine cycles, for instance two. Therefore, it is more convenient to obtain the control microcommands by means of logical circuits.

The characterization of the microcommands required for the two different cases of character exchange with the central processor is obtained by means of a signal on wire 67 which comes from the channel logic and is connected to the decoding network 204 of the control unit. The hardware sequencer is substantially composed of two cascaded flip-flops 240, 241. A character exchange interrupt request received from wire 156 enables AND gate 242 to transfer a cyclical timing pulse T6 to the clock input of flip-flop 240 (which is set). The direct output 243 of flip-flop 240 is fed, together with a signal on wire 67, to the decoding network 204 where they cause the generation of a first set of microcommands required for the character exchange. The direct output 243 is also connected to the clock input of flip-flop 241 and to wire 97, which inhibit at the end of the machine cycle in progress the acceptance of other character exchange interrupt requests. In the following machine cycle, the subsequent timing pulse T6 resets flip-flop 240 and the falling front of the signal on wire 243, sets flip-flop 241. The direct output 244 of such flip-flop applied to the decoding network 204 provides the generation of a new microcommand set which is required to conclude the character exchange operation. The direct output 244 is further connected to an input of AND gate 245 which receives the timing pulse T6 and applies such pulse to the reset input of flip-flop 241. Therefore, by a third T6 pulse, flip-flop 241 is reset. It should be noted that the interrupt signal on wire 156 falls before the third T6 pulse is received, so that the third T6 pulse has no effect on flip-flop 240. The fall of the signal on wire 156 is due to the fact that, as already seen, as soon as an interrupt request INT B is detected, it is masked (FIG. 6) and that signal SET 3 may be suitably in advance of T6. Therefore, once the two machine cycles used for the character exchange end, the computer may dedicate itself to servicing other channels, since the priority network is no longer inhibited by a signal on wire 97. Alternatively, the computer may then dedicate itself to internal calculation. It should also be noted that during the character exchange, the outputs of FOR register 203 may be inhibited by AND gate set 225, which is controlled by the output of NOR gate 246. The inputs of NOR gate 246 are connected to wires 243, 244.

In summary, present in the above-described control unit are resources dedicated to different service classes. Specifically, there are:
—an address register ROSAR SV for fast services,
—an address register ROSAR SL for slow services, and
—a hardware sequencer for character exchange.

Such resources are not specifically dedicated to any channel, but are assigned in time sequence to one of the channels by the priority network. In addition, the control unit comprises a logical network for examining specific conditions and a suitable number of registers for supporting conditions or particular states which arise in the computer. It has been seen, with reference to the channel logic (FIG. 6), that wire 55 is used to forward to the control unit a signal indicative of transfer of a character already performed in the execution of a fast or slow service. It has also been seen that flip-flop 34 in the channel logic is used to store a signal SI which characterizes the received information as a status information. These signals act on the control unit and change its behavior. For instance, it has been mentioned that in the absence of a signal on wire 55, the microprogram for a service recycles on a routine or, preferably, on a single microinstruction. In other words, the recycle microinstruction may be a branch. If signal 55 is present, the microprogram proceeds and the next microinstruction is addressed. Otherwise, the same microinstruction is called for again. This means that a signal on wire 55 acts as a conditioning signal for microcommands which supervise the operation of the incrementing unit 209. In one case, the incrementation is inhibited and the microninstruction address is not changed. In the other case, the address is changed according to information specified by the microinstruction itself.

Other conditions, however, must also be considered in the execution of a microprogram. Since the execution of a microprogram requires the intervention of the operative unit for more than a machine cycle, it is necessary to keep track of conditions which may occur in the operative unit. Such conditions are basically results of decoding operations on signal NZ2, operand signs, or carry out (COT) or carry in (CI). The results must be used in subsequent cycles (or other conditions peculiar of any specific computer). As shown in FIG. 8B, such conditions are stored in registers 321, 322, 323 (named indicator registers IR) dedicated respectively to fast services, slow services and internal computation.

The priority network, by means of signals on wires 99, 154, and SCI, selectively loads via controlling gate set 324, 326, the dedicated register. At the same time, the priority network causing the reading out from the selected register via gate sets 327, 328, 329, the required information and the transfer of it to the condition decoding network 330. The outputs of condition decoding network 330 forward condition signals to the microcommand generation network 204. Therefore, the microcommand generated by network 204 depends on the microinstruction received by register ROR and additionally on the condition signals received from decoding network 330. Network 330 also receives, through gate sets 332, 333 the signal coming from wires such as 55 and from output such as 234 of flip-flop 34 (FIG. 6) of the channel logic. Therefore, in this case, the existence of resources dedicated to service classes and not to channels are evidenced. The need to have multiple oriented resources is due to the fact that the different service classes are hierarchically interruptible. Therefore, it is required to keep track of the microprogram conditions which exist prior to an interruption so that when the interruption has been honored, the prior conditions may be restored.

THE OPERATIVE UNIT AND THE WORKING REGISTERS

FIG. 9 shows the operative unit and the working registers of the computer. The unit comprises two register banks 250, 251, an output resister A and an arithmetical and logic unit 252. Register bank 250 includes, for instance, 32 registers, each having 18 bits. The registers are addressed through inputs 256 by a microcommand code together with the signals already discussed which are forwarded by the priority network. (The commands forwarded by the priority network are attributed the same reference numbers as in FIG. 7). It is possible to store in an addressed register information received from path 255. Jointly or alternatively it is also possible to store the information stored or loaded in the selected register into output register A by a command to gate set 254.

The content of register A is applied to distribution path 257. By path 257, it is selectively applied through gate sets to the arithmetic unit 252 or through path 290 to an addressing register VI used to address the working memory (FIG. 10). The content of register A may also be forwarded through path 259 to gate set 260 and in turn to register bank 251. Alternatively, it may be forwarded through path 232 to the microprogram memory addressing registers.

Register bank 251 may also include 32 registers, each having 18 bits and addressed by microcommand code (through input 261), in addition to signals received from the priority network. The content of the addressed register of bank 251 is always present on distribution path 262. From path 262, it may be selectively applied to the arithmetic unit 252 through suitable gates.

The addressed register in bank 251 may be loaded with information received from many sources. We have already seen that data contained in register A may be transferred to register bank 251 through path 259 and gate set 260. Another source is path 263 which receives data from the peripheral units. Path 263 collects the information coming from channel registers, such as register 31 (FIG. 6) in the channel logic. Path 263 is controlled by gate set 264. Another source is the data path 265 (controlled by gate set 266) from the main memory. It is also possible to load into register bank 251 other data through channel 267 controlled by gate set 268. Channel 267 may be fed with information generated through operator actuated console keys. The two banks 250, 251 may be controlled in parallel so as to simultaneously address a desired register in both of the two banks 250, 251. This is evidenced by the presence of output register A. But the same is true for register bank 251, since from the operating point of view, register bank 251 is seen instant by instant as a unique register B.

Registers A and B provide the required physical supports for handling two data which are presented to the operative network. The operative network is connected to registers A and B through distributor paths 257, 262 and through a number of gates. Depending on the "format" of the information to be handled (e.g. binary, unpacked decimal, packed decimal), on the kind of operation to be performed, on the parallelism of the registers and the operative network, different types of organization of the gates is required. In the drawings, registers may have, for instance, parallelism of 18 bits, the same as for the arithmetic unit 252. This enables the execution of predetermined operations in parallel on two "bytes." However, the capability of operating on a single byte must not be excluded. For this reason, the gates which connect the inputs of the arithmetic unit 252 to the distribution paths 257 and 262 are divided into groups numbered 269, 270, 271, 272. For each group, there is an indication of the order number of the bits controlled by that group within the circle representing the group.

Similarly, the outputs of the arithemtic units are connected to a collector channel 279 through gate sets 274, 275. The outputs of the arithmetic unit are further connected, through gate sets 276, 277 to a decoding network 278 which detects particular output bit configurations, for instance all zeros, or all zeros limited to the bit groups corresponding to each gate set. The output NZ2 of the decoding network 278 is a condition signal which is used when it is required to subject the operations performed to suitable checks.

The operative network may be constructed using conventional logical/electrical structures and/or employing integrated circuit technologies. A detailed discussion of the operative networks, may be found in the board literature available on electronic computers, for instance, in the authoritative text of Robert S. Ledley "Digital Computer and Control Engineering" McGraw-Hill, Part 4. In addition, U.S. patent application 485,468 filed on July 2, 1974 with a priority date of July 10, 1973 describes a specific embodiment of the operative network built by functionally independent and distinct units. Reference to said application should by made for further details.

The operative unit must generally perform operations of the following kind:
— binary or decimal arithmetic operations (addition, subtraction and in case multiplication and division)
— logical operations AND/OR/EXCLUSIVE OR/-COMPARISON
— shift operations
— incrementing operations + 1, − 1.

The specific operation to be performed is defined by a set of microcommands 299 received from the control unit.

In order to complete the description of the operative section, it is useful to remark that the collector path 279 is connnected to path 255. Therefore, data present on collector path 279 following an operation performed by unit 252 may be transferred and stored in a suitable register of bank 250 and from there in A, then in bank 251 for subsequent storing in the main memory or for transfer to a peripheral unit. In fact, distributor path 262 at the output of register bank 251 communicates with the main memory unit through path 280 and gate set 281 and also with the peripheral units which are selectively enabled through gate set 283 and path 43 (FIG. 6). Since output data path 43 has a parallelism of one byte, while register bank 251 has a parallelism of two characters, only one character at a time will be transferred on path 262. The other character may be subjected to a SHIFT operation by the arithmetic unit 252, then reload into bank 251, and subsequently transferred on path 262. The operative unit is also provided with two by-pass paths 284, 285 controlled by gate sets 286, 287. The by-pass paths 284, 285 directly connect the distributor paths 257, 262 to the collector path 279.

It is important to remark that, while the register banks 250, 251 may each constitute, from a structural point of view, a single physical unit, from a functional point of view, they constitute a plurality of bank registers, each bank being dedicated to specific tasks and being selected by signals forwarded by the priority network. Therefore, in register bank 250, it is possible to identify a set A - SV exclusively dedicated to contain information pertaining to fast services, a set A - SL exclusively dedicated to contain information pertaining to slow services, a set A - CI exclusively dedicated to contain information pertaining to internal computation, four sets ASC1, ASC2, ASC3, ASC4, dedicated to contain information pertaining to character exchanges for each channel (or broadly dedicated to each channel). Likewise, in register bank 251, it is possible to identify dedicated sets, such as BSV, BSL, BCI, BSC1, BSCZ, BSC3, BSC4. Each of these sets constitutes an oriented resource dedicated to the execution of a specific class of operations and selectively assignable to every input/output channel. The only exception is character exchange resources which are strictly associated to a corresponding channel. Furthermore, the register sets do not contain the same number of registers. Each one is sized according to the particular needs of the services to which it is devoted. Thus, while the character-exchange resources may be limited to two registers, the resources for internal computation (those for slow services and those for fast services) may comprise more registers, for instance 6 each or a number different from set to set. In order to minimize the number of microcommands 256 and 261 required to address the registers, addressing is performed at a first level by selecting at each machine cycle the dedicated resources by means of priority network generated signal. Such signals include channel selection command and/or a service class selection command. The commands select at each machine cycle the desired resources. Within the desired resources, selection of one particular register is performed as microcommands are issued by the control unit.

THE WORKING MEMORY

FIG. 10 shows in block diagram form the memory unit of the computer. Basically, the memory unit is comprised of a memory stack 301 (for instance, a magnetic core memory), having 18-bit parallelism, an addressing register VI, a data register "DATA" and a suitable number of communication paths. The addressing register VI receives from path 290 (FIG. 9) through AND gate set 291, the coded information contained in the A register. (The A register is part of the operative unit shown in FIG. 9.)

Register VI has a size correlated to the maximum memory capacity. For instance, an 18-bit register enables addressing of about 256,000 memory positions and is consistent with the parallelism of the described computer. The data to be written into the memory are loaded into the DATA register through path 280, controlled by gate set 281. These data are forwarded, as previously described by register B of the operative unit. The data contained in DATA register are then loaded into the memory position addressed through path 290. The data read out from memory are forwarded onto path 302 and are loaded into register DATA through gate set 303. From register 303 they are transferred into the B register through path 265.

What is claimed is:

1. In a microprogrammed computer system having a plurality of input/output channels for connecting a central processor to peripheral units, apparatus which comprises:

first means in said central processor for receiving interrupt requests from said peripheral units through said input/output channels;

second means said central processor coupled to said first means for assigning priority to said interrupt requests, said second means including first assignment means for assigning said interrupt request to priority classes based on the type of service requested by said interrupt request and second assignment means for assigning priority to said interrupt requests within each said priority class based on the input/output channel carrying said interrupt request; and a plurality of gating and storage means in said central processor, wherein groups of said plurality of gating and storage means are specifically dedicated to each of said priority classes of interrupt requests for enabling execution of the corresponding type of service, said groups of gating and storage means being responsive to said second means for enabling the execution of a service of another class having higher priority utilizing the one of said gating and storage means specifically dedicated to said higher priority class, wherein a one of said gating and storage means groups can execute a service associated with a one of said priority classes in parallel with execution of a service associated with a second of said priority classes by a second of said gating and storage means groups.

2. A microprogrammed computer system as claimed in claim 1 further comprising a microprogram control memory within said central processor and wherein said plurality of gating and storage means comprises:

a plurality of addressing registers coupled to and for addressing said microprogram control memory, one register per class of services; and a plurality of working register sets responsive to said second means and coupled to said microprogram control memory for receiving microcommands, each set being specifically dedicated to and sufficient for enabling execution of a class of services.

3. A data processing system having a plurality of input/output channels connecting a central processing unit to a plurality of peripheral units, said system comprising:

first means in said central processing unit coupled to said input/output channels for receiving interrupt requests and data from said peripheral units;

second means in said central processing unit coupled to said first means for receiving said interrupt requests and for classifying said interrupt request into service priority classes, third means coupled to said second means for ordering said interrupt requests within said service priority classes according to its input/output channel source;

a first plurality of gating and register means dedicated to each input/output channel, said first plurality coupled to said first means for receiving data and responsive to said second means for enabling character exchange interrupt requests; and a second plurality of gating and register means dedicated to each service priority class, said second plurality of gating and register means coupled to said first means for receiving data and responsive to said second means for interrupting a first service being executed and enabling execution of another service having higher priority than said first service, wherein said second plurality of gating and register means can provide for execution of a service in a one of said input/output channels in parallel with execution of character exchange in a second of said input/output channels.

* * * * *